Patented Mar. 19, 1935

1,994,852

UNITED STATES PATENT OFFICE 1,994,852

PROCESS OF N-ALKYLATING AROMATIC AMINES OF THE BENZENE AND NAPHTHALENE SERIES

Paul Whittier Carleton, Pennsgrove, and Joseph Donald Woodward, Salem, N. J., assignors to E. I. du Pont de Nemours & Company, Wilmington, Del., a corporation of Delaware No Drawing. Application March 9, 1932
Serial No. 597,802

17 Claims. (Cl. 260—128)

This invention relates to mono- and di-alkyl aromatic amines and a method for the production thereof. More particularly, the invention relates to alkylations in which alkyl groups containing two or more carbon atoms are substituted in an amino group of an aromatic amine. It especially contemplates the ethylation of aniline and its homologues.

It is well known that hydrogen atoms attached to the nitrogen of the amino group of a primary aromatic amine may be replaced by alkyl radicals such as, for example, methyl, ethyl, etc. If one hydrogen atom is replaced, the product is called the mono-alkyl aromatic amine while if both hydrogen atoms are replaced a di-alkyl aromatic amine results. Various processes have previously been proposed for the production of compounds of this character. Thus, dimethyl aniline or mixtures thereof, with mono-methyl aniline may be produced by heating methanol and aniline in a relatively small amount of sulfuric acid under elevated temperature and pressure. However, if an alcohol of a higher order than methyl, for example, ethyl alcohol is similarly reacted with sulfuric acid and aniline the results are quite unsatisfactory because of side reactions and the resultant low yields. Generally speaking, moreover, while other processes have been proposed for the alkylation of primary aromatic amines to a higher order than methyl, for one reason or another the results leave much to be desired.

The present invention has for an object the provision of a new and improved method for producing mono- and di-alkyl aromatic amines. A further object of the invention is the production of mono- and di-alkyl aromatic amines, particularly those of a higher order than methyl, by a simple, easily controlled process which is characterized by high efficiency and flexibility. Another object of the invention is the production of mixtures of mono- and di-ethyl anilines or ethylated homologues of aniline by a process of the character above described, whereby because of the simplicity and flexibility of the process the proportions of the mono- and di-ethylated amines in the product may be varied within relatively wide limits with only a relatively slight change in the procedure employed. A still further object of the invention is the production of secondary and tertiary alkylated amines from primary aromatic amines in such a manner that the reaction product contains substantially no unconverted primary amine, or in other words, that substantially all of the primary aromatic amine is alkylated to form the mono- and di-alkyl aromatic amines. Other objects of the invention will be apparent by reference to the following specification in which its details and preferred embodiments are described.

These objects are accomplished according to the invention whereby mono- and di-alkyl aromatic amines are produced by reacting primary aromatic amines with an alkyl alcohol and hydrogen chloride, under elevated temperature and pressure, the proportions of hydrogen chloride being less than one mole per mole of primary aromatic amine. The mono- and di-alkyl aromatic amines may be recovered from the reaction product in any suitable manner. Recovery may be effected, for example, by making the reaction product alkaline, whereupon the oily alkylated amines separate from the remainder of the product and may be removed by any suitable method. The mixture thus obtained may be used as such in certain chemical processes or, if desired, the mono- and di-alkyl amines may be separated from each other by any suitable method, for instance by fractional distillation or fractional crystallization of a salt of the amine.

In carrying out the above process the hydrogen chloride may be added to the raction mixture in a variety of ways, e. g., as such, combined with part of the primary aromatic amine as the hydrochloride, or as a solution in the alkyl alcohol. Generall speaking, the last named method is preferred.

According to a preferred embodiment, the invention is applied to the ethylation of aniline or its homologues. This is preferably accomplished by reacting the aniline with ethyl alcohol and hydrogen chloride under autogeneous pressure and at an elevated temperature, the proportions of hydrogen chloride being less than about one mole per mole of aniline and being so controlled as to produce mixtures of mono- and di-alkyl aniline in desired ratios.

While the invention is susceptible of considerable variation and modification in the manner of its practical application, particularly as regards the proportions of materials employed and the exact manner of procedure, the following examples, in which the proportions are given in parts by weight, will illustrate how the invention may be practiced.

*Example I*

A solution of 137 parts of hydrogen chloride in 438 parts of commercial ethyl alcohol (95% by volume) is heated together in a closed vessel at 180–185° C. with about 465 parts of aniline. The autogenous pressure, that is, the pressure produced by the reaction mixture, corresponds to about 200 to 250 pounds per square inch. The charge is made alkaline after 5 hours heating and the oil is separated by means of a conical separator. The resultant product contains about 35% mono-ethyl aniline and 65% di-ethyl aniline.

*Example II*

Aniline, aniline hydrochloride and ethyl alcohol in proportions corresponding to about 117 parts of aniline, 486 parts of aniline hydrochloride and 438 parts of ethyl alcohol are reacted together for 5 hours in an enamel lined autoclave, under the autogenous pressure of the reaction mixture and at a temperature of about 180 to 185° C., the pressure in this case corresponding to about 200 to 260 pounds per square inch. A mixture of the mono- and di-ethyl aniline recovered from the reaction product as described in Example I analyzes approximately the same as in Example I.

*Example III*

About 438 parts of vaporous ethyl alcohol and 119 parts of dry hydrogen chloride are introduced into 465 parts of aniline and the resultant product is heated under a pressure of about 200 to 250 pounds per square inch and at a temperature of about 180 to 185° C. for a period of 5 hours. The mono- and di-ethyl aniline in the resultant product are recovered in the usual manner to yield a product analyzing about 60% mono-ethyl aniline and 40% of di-ethyl aniline.

It will be understood that the invention is not limited by the above examples. Thus, while the invention is preferably applied to ethylations, it is applicable to any other alkylations of a higher or lower order. In general, the class of amines to which the invention is preferably applied may be represented by the formula:

R·NH₂ in which R is a saturated or unsaturated aromatic nucleus and may or may not contain a substituent or substituents other than the amino group. As previously indicated, the invention has been found to be particularly advantageous for alkylating amines of the above general formula in which R represents an unsaturated carbocyclic nucleus, and especially where R is a phenyl nucleus, such as, for example, aniline and homologues thereof, e. g., the o, m, and p toluidines and the xylidines. The exact conditions of operation may vary widely according to the nature of the amine treated and the desired products.

In practicing the invention it is preferable to heat the reactants together in a closed vessel so that the pressure of the reaction is the autogenous pressure produced by the reaction mixture. In operating according to this preferred method of procedure, it will be apparent that the pressure is largely dependent upon the proportions of the various reactants present. The method of operation is not limited, however, in the application of pressure from any particular source. That is to say, instead of the autogenous pressure other sources of pressure may be employed. For example, the pressure of the reaction may be produced wholly or in part by introducing into the reaction vessel a compressed gas or vapor which is inert to the reactants or does not affect the reaction unfavorably.

While the invention is not limited to any particular pressures, elevated pressures in general tend to aid the reaction and pressures from slightly superatmospheric to a thousand atmospheres or more are contemplated. According to our present preferred method of procedure, pressures within the range of about 10–100 atmospheres are the most desirable. In ethylating primary aromatic amines of the benzene series pressures of about 10–30 atmospheres have given especially desirable results.

The temperature is subject to considerable variation depending largely upon the specific reactants. In general, however, the upper temperature limit should be such as to avoid the introduction of alkyl groups into the aromatic ring. The lower temperature limit is governed more or less by the rate of reaction desired. Thus, an operating temperature which is too low may slow up the rate of reaction to an undesirable extent. In ethylations, such as those of aniline or its homologues, we prefer to employ temperatures within the range of about 160–190° C. and preferably 180–185° C. Naphthylamines, on the other hand, are preferably ethylated at temperatures below about 130° C.

As previously indicated, regardless of the form in which the hydrogen chloride is employed, that is, whether as such or as a hydrochloride of the amine or in any other form, the proportions thereof present in effecting the alkylation should be less than one mole per mole of primary aromatic amine. Moreover, our experience has shown that the most desirable results are obtained when the proportions of hydrogen chloride present during the reaction correspond to more than about 0.5 mole per mole of amine. Generally speaking, we prefer to employ proportions of hydrogen chloride varying within the range of about 0.6–0.9 mole per mole of amine. Very desirable results are obtained when little or no water is present in the reaction mixture. In carrying out the reaction, therefore, we prefer to employ hydrogen chloride in anhydrous form.

Other variables entering into the reaction are the time and the proportions of alkyl alcohol employed. The former will vary largely with the specific conditions of temperature, pressure and nature and proportions of the reactants, and may be determined readily by empirical methods. The proportions of alkyl alcohol may vary within relatively wide limits depending largely upon the desired degree of alkylation, but should preferably correspond to at least one mole per mole of primary aromatic amine.

Throughout the specification and claims, the term "alkyl" may be defined as a radical derived from an acyclic hydrocarbon by the elimination of one atom of hydrogen, such as, for example, methyl, ethyl, propyl, isopropyl, allyl, butyl, isobutyl, and the like radicals. It will be understood, however, that the invention is preferably applied to alkylations of aromatic amines in which saturated alkyl groups are introduced into the amino groups.

It will be observed in the examples, that, within the preferred range of hydrogen chloride concentrations, a relatively small change in the amount of hydrogen chloride present in the reaction mixture will produce a marked variation in the proportions of mono- and di-alkyl aromatic amine formed, all other conditions of time, temperature, pressure and proportions of reactants remaining the same. Since the commercial demand for a given mono-alkyl amine and the corresponding dialkyl amine may vary widely from time to time the advantage of being able to modify the process to meet the demand as it arises will be obvious. Heretofore, this has been possible only to a much more limited extent.

The invention is further advantageous in that desirable results are obtained with relatively small proportions of hydrogen chloride, thereby enabling the production of alkylated aromatic amines at a lower cost than has been possible with prior processes. Another factor of considerable benefit resulting from the present invention is the completeness with which the alkylation may be effected. Thus, in some processes heretofore proposed for ethylating primary aromatic amines whereby mixtures of mono- and di-ethyl aromatic amines are obtained, the reaction is incomplete and the resultant product is contaminated with a substantial quantity of unconverted primary aromatic amine. Such processes customarily require removal or recovery of the unconverted primary amine, which is a troublesome operation and adds to the cost of the process. According to our invention mixtures of mono- and di-ethyl aromatic amines may be obtained directly without the difficulties and expense involved when a substantial amount of unconverted primary aromatic amine is present. Since, in actual practice, it is difficult to determine the presence of small amounts of the primary amine in the presence of the secondary and tertiary amines, it will be understood that by substantially no unconverted primary aromatic amine, we mean less than about 1% by weight.

As many apparent and widely different embodiments of this invention may be made without departing from the spirit thereof, it is to be understood that we do not limit ourselves to the foregoing examples or description except as indicated in the following claims.

We claim:

1. In a process of N-alkylating aromatic amines the step which comprises reacting a primary aromatic amine of the benzene or naphthalene series with a monohydric alkyl alcohol and less than one mole of hydrogen chloride per mole of amine, under super-atmospheric pressure.

2. In a process of N-alkylating aromatic amines the step which comprises reacting a primary aromatic amine of the benzene series with a monohydric alkyl alcohol and 0.6 to 0.9 mole of hydrogen chloride per mole of amine, under super-atmospheric pressure.

3. In a process of N-alkylating aromatic amines the step which comprises reacting a primary aromatic amine of the benzene series, hydrogen chloride and a monohydric alkyl alcohol, under super-atmospheric pressure, in proportions corresponding to less than one mole of hydrogen chloride per mole of primary aromatic amine and at least one mole of alkyl alcohol per mole of primary aromatic amine.

4. In a process of N-alkylating primary aromatic amines the step which comprises reacting a primary aromatic amine of the benzene series with a monohydric alkyl alcohol containing at least two carbon atoms in the presence of less than one mole of hydrogen chloride per mole of aromatic amine, under super-atmospheric pressure.

5. In a process of N-alkylating aromatic amines the step which comprises reacting a primary aromatic amine of the benzene series with a monohydric alkyl alcohol and less than one mole of hydrogen chloride per mole of amine, under super-atmospheric pressure.

6. In a process of N-alkylating aromatic amines the step which comprises reacting a primary aromatic amine of the benzene series with a saturated monohydric alkyl alcohol and less than one mole of hydrogen chloride per mole of amine, under super-atmospheric pressure.

7. In a process of producing N-mono- and N:N-diethyl aniline the step which comprises reacting aniline with ethyl alcohol and less than one mole of hydrogen chloride per mole of aniline, under super-atmospheric pressure.

8. In a process of producing N-mono- and N:N-diethyl aniline the step which comprises reacting together aniline, hydrogen chloride, and ethyl alcohol, under super-atmospheric pressure and in proportions corresponding to less than one mole of hydrogen chloride per mole of aniline and at least one mole of ethyl alcohol per mole of aniline.

9. In a process of producing N-mono- and N:N-diethyl aniline the step which comprises reacting together aniline, hydrogen chloride and ethyl alcohol, at a super-atmospheric pressure, the proportions of hydrogen chloride corresponding to about 0.6 to about 0.9 mole per mole of aniline.

10. The process of producing N-mono- and N:N-diethyl aniline which comprises reacting aniline with ethyl alcohol, and less than one mole of hydrogen chloride per mole of aniline, under super-atmospheric pressure and at a temperature within the range of about 160° C. to about 190° C.

11. In a process of producing N-mono- and N:N-diethyl aniline the step which comprises reacting aniline with ethyl alcohol in the presence of less than one mole of hydrogen chloride per mole of aniline, under super-atmospheric pressure within the range of about 10 to about 30 atmospheres.

12. A process of N-ethylating aniline which comprises reacting aniline and ethyl alcohol in the presence of hydrogen chloride under super-atmospheric pressure and at a temperature of about 160° C. to about 190° C., the proportions of hydrogen chloride corresponding to about 0.6 to about 0.9 mole per mole of aniline and the proportions of ethyl alcohol corresponding to at least one mole per mole of aniline.

13. A process of N-ethylating aniline which comprises reacting together in a closed vessel, aniline, ethyl alcohol and hydrogen chloride in proportions corresponding to about 0.6 to about 0.9 mole of hydrogen chloride per mole of aniline and at least one mole of ethyl alcohol per mole of aniline, under autogenous pressure and at a temperature of about 180° C. to about 185° C.

14. In a process involving replacing by a lower alkyl radical a hydrogen of an amino group of an aromatic mono-amine selected from the group consisting of aromatic amines of the benzene and naphthalene series, the step which comprises reacting together under super-atmospheric pressure said aromatic amine, hydrogen chloride and a monohydric alcohol of the lower aliphatic series, the proportions of hydrogen chloride corresponding to less than one mole per mole of aromatic amine.

15. In a process involving replacing by an ethyl radical a hydrogen of an amino group of an aromatic mono-amine selected from the group consisting of aromatic amines of the benzene and naphthalene series, the step which comprises reacting together under super-atmospheric pressure said aromatic amine, hydrogen chloride and ethyl alcohol, the proportions of hydrogen chloride corresponding to less than one mole per mole of aromatic amine.

16. In a process involving replacing by an ethyl radical a hydrogen of an amino group of an aromatic mono-amine selected from the group consisting of aromatic amines of the benzene and naphthalene series, the step which comprises reacting together said aromatic amine, hydrogen chloride and ethyl alcohol under super-atmospheric pressure, the proportions of hydrogen chloride being within the range of about 0.6 to about 0.9 mole per mole of aromatic amine.

17. In a process of N-alkylating aromatic amines having the formula $RNH_2$, in which R represents an aryl hydrocarbon radical of the benzene series, the step which comprises reacting said amine with a monohydric alkyl alcohol and 0.6 to 0.9 mole of hydrogen chloride per mole of amine.

PAUL WHITTIER CARLETON.
JOSEPH DONALD WOODWARD.